United States Patent [19]

Oppeneer

[11] Patent Number: 4,794,963
[45] Date of Patent: Jan. 3, 1989

[54] METHOD AND APPARATUS FOR OPTIMIZING THE CUTTING OF RAW BOARDS INTO PRODUCT BOARDS

[75] Inventor: Steven J. Oppeneer, Hingham, Wis.

[73] Assignee: Nemschoff Chairs, Inc., Sheboygan, Wis.

[21] Appl. No.: 104,769

[22] Filed: Oct. 5, 1987

[51] Int. Cl.[4] .................. B27B 1/00; B27B 27/00; B27M 1/00

[52] U.S. Cl. ...................... 144/358; 29/407; 83/44; 83/61; 83/71; 83/102.1; 83/408; 83/722; 144/376

[58] Field of Search .............. 144/376, 378, 358; 29/407; 83/44.71, 408, 717, 722, 723, 726, 61, 102.1

[56] References Cited

U.S. PATENT DOCUMENTS

| | | | |
|---|---|---|---|
| 2,303,480 | 12/1942 | Lipic, Jr. | 144/358 |
| 3,329,181 | 7/1967 | Buss et al. | 83/34 |
| 3,811,353 | 5/1974 | Miles | 83/71 |
| 3,931,501 | 1/1976 | Barr et al. | 83/71 X |
| 3,941,019 | 3/1976 | Baldwin et al. | 83/71 |
| 4,468,992 | 9/1984 | McGeehee | 83/71 X |

Primary Examiner—Frank T. Yost
Attorney, Agent, or Firm—James E. Nilles; Thomas F. Kirby

[57] ABSTRACT

An apparatus for optimizing the yield from a raw board, having defects randomly located therein, and for cutting the raw board optimally into product boards of predetermined specification, thereby cutting out any defects. The apparatus includes an adjustable fence located at a defect detection station, oriented along a path and movable transversely to the path. Located at the station are laser lines for temporarily forming lines lengthwise on the raw board. These laser lines cooperate with the fence to determine clear and full widths of the raw board. Also disclosed is a method for using the apparatus for optimizing the yield of the raw board. The clear width and full width information is transmitted to a computer while any waste portion is cut off and as all defects between the laser lines are being marked by an operator. In the meantime, the computer calculates an optimum solution for product to be cut from the board. A sub-board is then cut from the raw board lengthwise, according to the solution calculated by the computer. This leaves a remainder board which is returned to the station while the sub-board is cross-cut into one or a number of product boards as specified in the manifest held in the memory of the computer. Upon its return to the station, the remainder board is again examined and the cycle repeated until the full width has been completely optimized.

15 Claims, 4 Drawing Sheets

METHOD AND APPARATUS FOR OPTIMIZING THE CUTTING OF RAW BOARDS INTO PRODUCT BOARDS

BACKGROUND OF THE INVENTION

This invention relates to apparatus and methods for automated lumber stock handling, particularly for cutting lumber to avoid defects and produce pieces of particular dimensions in accord with a manifest or other product listing. Specifically, the invention relates to complete defect detection, transport, cutting and labeling systems in which a computer gathers data as to defect location on a raw board and calculates in two dimensions the optimum solution for product pieces to be cut from the board.

The concept of precise and accurate optimum yield computation and cutting, combined with automatic defect avoidance, is one which has long been needed and desired in the lumber-handling industry and in related industries that use lumber, such as the furniture industry. Several devices have heretofore been proposed as solutions to the problems, although none have presented complete solutions. For instance a patent issued to Baldwin, U.S. Pat. No. 3,941,019, shows a computer-controlled system for cross-cutting pieces of lumber after the lumber has been ripped, that is, cut lengthwise. This approach, however, ignores the fact that the lumber must be optimized in two dimensions in order for it to be fully optimized. The apparatus disclosed in a patent issued to Buss, et al., U.S. Pat. No. 3,329,181, being a similar attempt to solve these problems, has similar limitations.

This invention relates to improvements over the apparatus set forth above and to solutions to the problems raised thereby.

SUMMARY OF THE INVENTION

The invention includes an apparatus for optimizing the yield from a generally rectangular raw board, having defects randomly located therein, and for cutting the raw board into an optimum number of various different product boards of predetermined specification, thereby cutting out any defects. This apparatus includes a first conveyor means for conveying the raw board along a first path to a first station, and second conveyor means for transporting the raw board along a second path transverse to the first path and away from the first station. An adjustable fence is located at the first station, oriented along the second path and movable transversely to the second path. Located at the first station are temporary line-forming means for temporarily forming lines lengthwise on the raw board and transverse to the first path. These line-forming means cooperate with the fence to determine a clear width and a full width of the raw board. Defect marking means are included for making marks on the raw board between the lengthwise lines, indicating the location thereon of any defects between the lines. Means are provided for cutting the raw board lengthwise into a sub-board and a remainder board. The apparatus also includes electronic computer means for receiving clear width and full width information from the fence and calculating an optimum solution as to the width and length of product board to be cut, thereby determining the width of the sub-board and the length of the product boards to be cut from the sub-board. The sub-board is cut transversely into at least one product board at a second station by another cutting means. Return conveyor means are provided at the output of the first station for transporting the remainder board back to the input of the first station.

The invention further includes a method for using the above apparatus for optimizing the yield of the raw board, including determining a first line clear of defects as near as possible to a near edge of the raw board, determining a second line indicating the edge of the first defect nearest the first line, and determining a last line clear of defects on a far edge of the raw board. The distance between the first line and the second line is termed the first clear width, while the distance between the first line and the last line is termed the full width. As the portion of the raw board between the first line and the near edge is cut off as waste, a human operator marks all defects within the width of the board between the two laser lines which constitute the temporary line-forming means, and a scanner determines the locations of these defect marks. This defect mark location information, along with the clear width and full width information, is then transmitted to the computer, which calculates an optimum solution in both the length and width dimensions for product to be cut from within the raw board. A sub-board is then cut from the raw board lengthwise, with the width of the sub-board being determined according to the solution provided by the computer. This leaves a remainder board which is returned to the first station while the sub-board is cross cut into one or a number of product boards as specified in the manifest held in the memory of the computer. Each time the raw board returns to the first station, it is again examined by the operator and the defects occurring between the laser lines are marked. Each time, as the rip cut according to the prior solution is made, the scanner determines the location of any marked defects and transmits that information to the computer for the calculation of the next solution, until the raw board is completely optimized.

It is thus an object of the invention to provide a method and apparatus for optimizing the yield from a raw board of product boards listed on a predetermined manifest.

Another object of the invention is to provide a method and apparatus as set forth above wherein the optimization is done in both the length and width dimensions.

A more specific object of the invention is to provide a method and apparatus as described above also including using a labelling means to label each product board for identification purposes using information available from a computer, that computer having done the optimization calculation.

Other objects and advantages of the invention will become apparent hereinafter.

DESCRIPTION OF THE PREFERRED EMBODIMENT

Figures 1, 10:
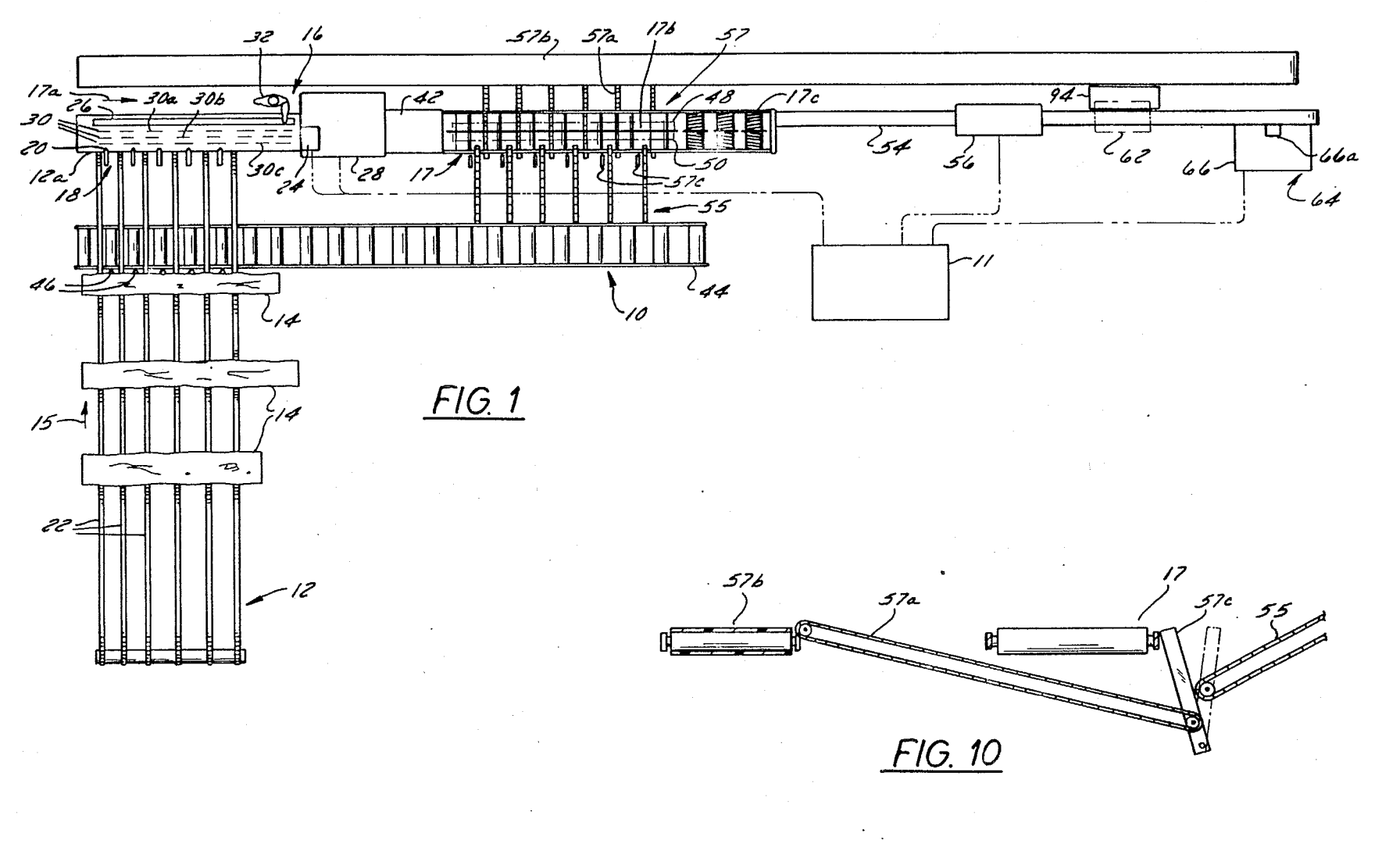
FIG. 1 is a top view, partially schematic, of an apparatus assembled according to one embodiment of the invention.
FIG. 10 is a cross sectional view of the apparatus shown in FIG. 1, taken generally along line 10—10.

Referring now to FIG. 1, there is shown an apparatus 10 constructed according to a preferred embodiment of the invention. The apparatus 10 includes an electronic computer 11 in which has been stored a manifest listing all the requirements of a particular run of product boards, including the part numbers, dimensions and quantities required. The invention provides for an input conveyor means 12, such as a chain conveyor, for conveying the raw boards 14 along a first path 15 into position at a first station 16, to begin the subject method. A rip conveyor 17 of any suitable type, such as a roller conveyor, is positioned at the terminating end 12a of the input conveyor 12 and oriented so as to, when actuated, convey the raw board 14 along a second path 17a, generally perpendicular to the first path 15. Stop means 18, such as movable fingers 20, located between the separate chains 22 of the input conveyor 12, are provided for controlling the progress of the raw boards 14 along that conveyor 12, and stopping them from moving forward if a raw board is already in place at the station 16. The first station 16 includes temporary line-making or line-forming means 24, such as a light source shone in a direction generally along the second path 17a. In particular, the preferred light source would be a source of collimated light, such as parallel laser lines 30 as shown in the drawing figures.

Figure 2:
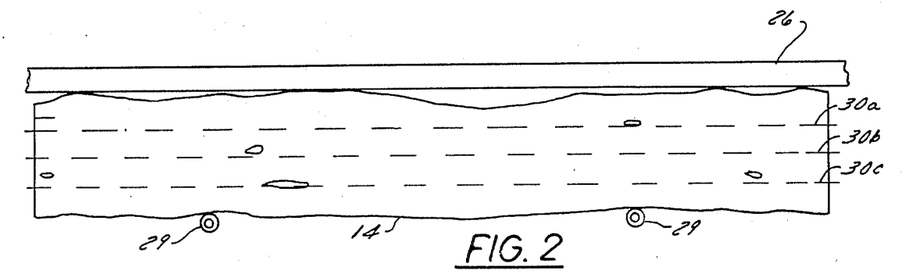
FIGS. 2, 3, 4, 5 and 6 are top views of a raw board in various with respect to the line-making means according to the method of the invention.
Figure 3:
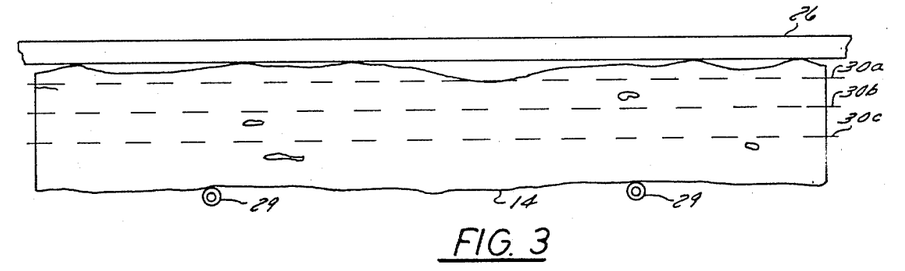

Also located at the first station 16 is an adjustable fence 26, for use with a rip saw mechanism 28 located there as well as with the temporary line-making means 24. The way in which the fence 26 and lasers 30 cooperate with the rip saw mechanism 28 in the operation of the apparatus 10 will now be described, with particular reference to FIGS. 2 through 6. As shown in FIG. 2, any raw board 14 may have defects, such as splits, knots and general unevenness randomly distributed along each side edge, along both end edges and throughout the width of the board itself. As referred to above, the input conveyor 1 delivers the raw board 14 into position against the fence 26, where it is secured by attachment means 29, such as air cylinder-operated clamps, as is well known in the art. Depending upon the width of raw board 14, with fence 26 in its fully retracted position as shown in FIG. 2, the raw board will generally not pass laser lines 30 entirely before contacting the fence.

As referred to hereinafter, the laser line nearest the fence 26 is termed the near or first laser line 30a. The laser line farthest from the fence 26 is termed the far or third laser line 30c, while the remaining laser line is termed the center or second laser line 30b. The near laser line 30a is aligned with the saw blade 28a (FIG. 7) in rip saw mechanism 28. The far laser line 30c is used to determine the last clear edge as disclosed in more detail below. Hence the far laser line 30c is spaced about six to eight inches from the near laser line 30a. This spacing is used because the raw boards 14 have widths running up to 14 inches, while the largest product required by the manifest may be less than six inches wide.

As with any collection of different values, the manifest, a collection of different length and width values for product boards, includes a largest product board width and a smallest product board width. As the product boards are produced, the computer removes them from the manifest. The spacing of the center laser line 30b from the first laser line 30a is preferably the largest width of product board currently required in the manifest, and this spacing with respect to the first laser line is adjustable by any suitable means. In particular, it could be adjustable by the computer 11, or it could be adjusted by a human operator 32 (FIG. 1) by means of a set screw type attachment (not shown). During the filling of the manifest, that is, as product boards are cut and when the manifest is satisfied as to the largest product board width, the positioning of the second laser line 30b may be adjusted to the next largest width and so on until the manifest is completely satisfied. On the other hand, it may occur that the largest width in the manifest is the last to be satisfied, in which case the second laser line 30b would not be moved at all during the cutting operation.

Throughout the description of the operation of fence 26, the terms "near" and "far" will be used to refer to relative proximity to the fence. The term "clear" when applied to an area of the raw board 14 or other type of board refers to the fact that the area is clear of defects.

Figure 4:
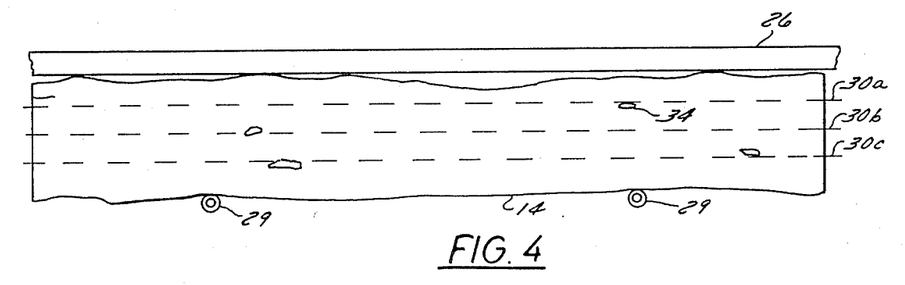

Fence 26 is connected to the computer 11 such that the computer receives information as to the relative position of the fence at all times on command from the operator 32 (FIG. 1). Once the raw board 14 is secured against the fence 26 as shown in FIG. 2, the first step of the subject method is to determine the first clear width of the board. To accomplish this step, the operator 32 moves the fence, by any suitable known control, laterally with respect to the laser lines 30 until the near laser line 30a is aligned with the first clear edge of the board as in the position shown in FIG. 3. The first clear edge of the board is defined as a line as near as possible to the fence but which does not encounter any edge defects in the board. Hence when the near laser line 30a is aligned with the first clear edge, the operator 32 sends a signal to the computer 11 that the first clear edge has been defined. Next the operator 32 moves the fence 26 until the near laser line 30a is aligned with the near edge of the first defect 34 within the width of the board, as shown in FIG. 4. Once this second line is established, the operator 32 again sends a signal to the computer 11 to that effect. The area of the raw board 14 between the first clear edge and this second line is termed the first clear width.

Figure 5:
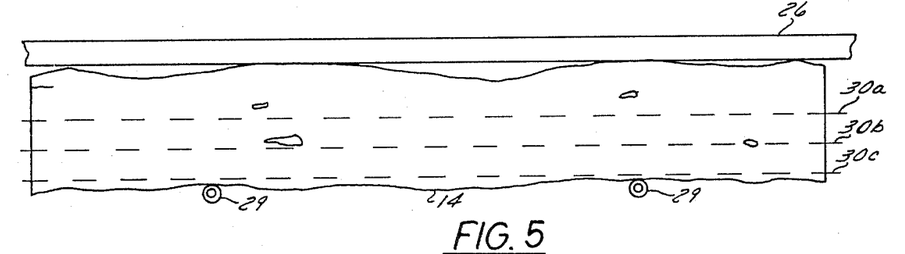

The next step in the method is to determine the full width of the raw board. The full width is determined to be the distance between the first clear edge and the last clear edge of the board. Since the first clear edge has already been determined as set forth above, the last clear edge must now be determined. To do this, the operator 32 moves the fence 26 until the third laser line 30c is aligned with the last clear edge of the board, that is, a line which is as far as possible from the fence without encountering any edge defects in the far side of the board, as shown in FIG. 5. Because of the spacing mentioned above between first laser line 30a and third laser line 30c, fence 26 does not have to be moved the full width of raw board 14, but rather the full width less the spacing between first and third laser lines 30a and 30c, respectively. This saves time as well as reducing the cost of fence 26, since the travel of the fence is not required to be as large as if third laser line 30c were not present. Again the operator 32 sends a signal to computer 11 to the effect that third laser line 30c is now positioned at the last clear edge. The full width of raw board 14 is thus established, based on the position of fence 26 relative to third laser line 30c. Fence 26 may then be returned to the position shown in FIG. 3, with first laser line 30a aligned with the first clear edge on raw board 14.

Figure 6:
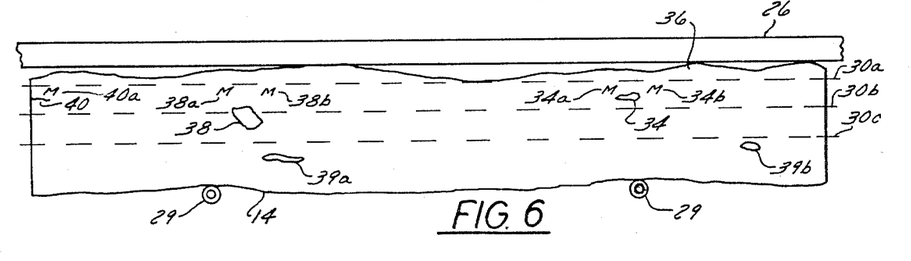
Figures 7, 7A, 8, 9:
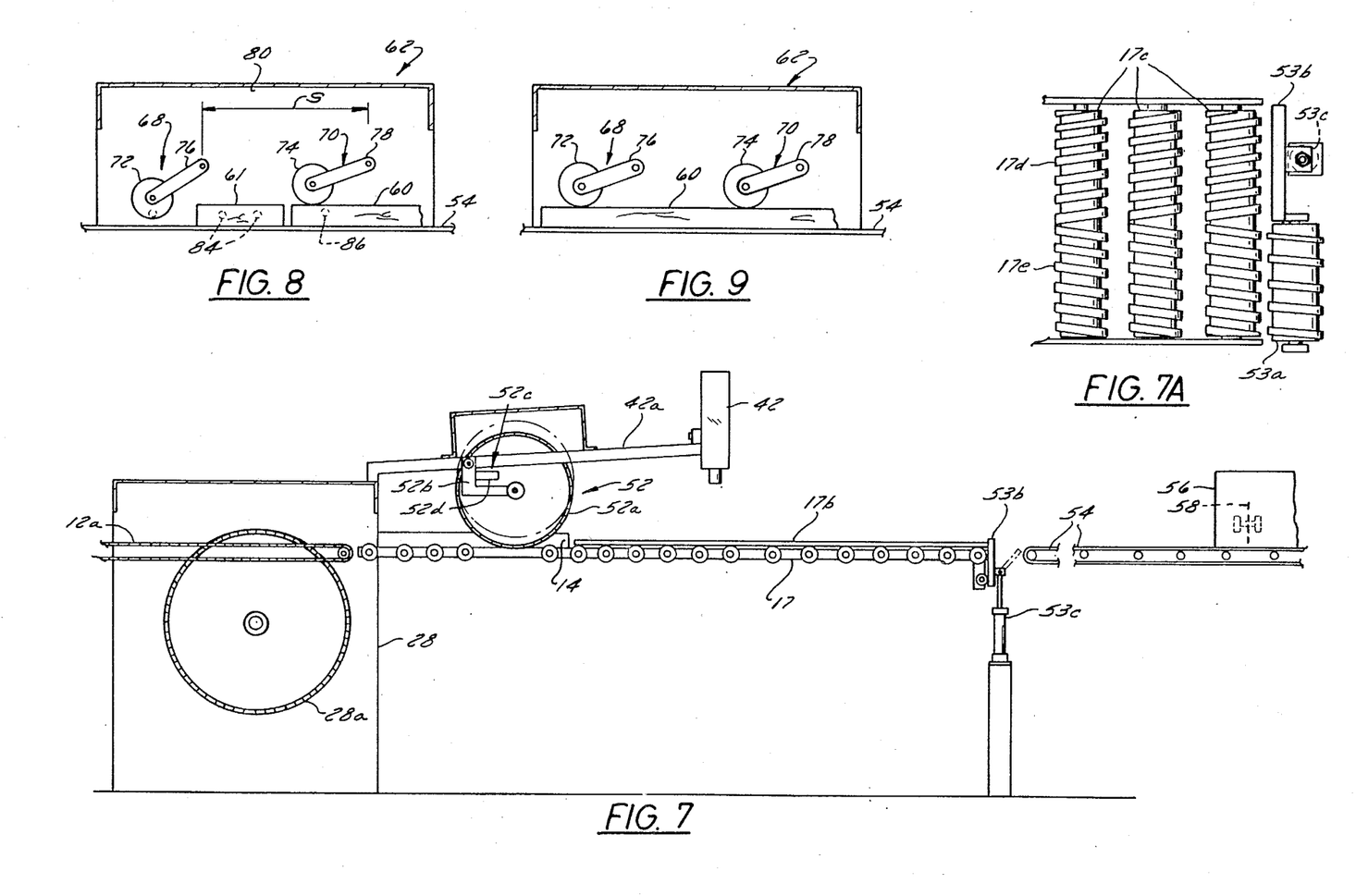
FIG. 7 is a cross sectional view of the apparatus shown in FIG. 1, taken generally along line 7—7.
FIG. 7A is an enlarged top view of a portion of the rip conveyor, showing the spiral blades of some of the rollers of the conveyor.
FIG. 8 and 9 are schematic side views of the blow-off mechanism employed in a preferred embodiment of the invention.

The next step, referring now to FIGS. 6 and 1, is to cut off the waste area 36 between first laser line 30a and the near edge of raw board 14. This is done by actuating rip conveyor 17 to move raw board 14 along a path 17a generally perpendicular to first path 15, and toward and past saw blade 28a (FIG. 7). Since first laser line 30a is aligned with blade 28a, that is where the kerf of the saw will be located. As waste area 36 is being cut off, raw board 14 is conveyed past the operator 32. As the raw board 14 passes, the operator 32 marks all of the defects within the width of raw board 14 which occur between the two laser lines 30a and 30b, including any end defects at either end of the raw board. Generally the operator 32 makes these marks by use of any suitable marking means, such as chalk 37 (FIG. 1) manually used to mark the raw board. This marking means could alternatively comprise an automatic marker (not shown) suitably mounted over raw board 14 and operated by the operator 32 as the board is cut by saw blade 28a, and even an automatic defect detection device (not shown) for detecting and marking the defects without the intervention of an operator, although the applicants have observed that an experienced human operator most efficiently marks the defects with simple chalk 37. Such an automatic defect detection device could, for example, take the form of that disclosed in prior art U.S. Pat. No. 3,329,181 hereinbefore referred to. Thus, as shown in FIG. 6, the defect 34 already referred to is marked with marks 34a and 34b, one before and one after the defect as it is conveyed by the second conveyor 17. In a similar manner, another defect 38 within the width of raw board 14, and only partially between the two laser lines 30a and 30b, is also marked, as shown by marks 38a and 38b. On the other hand, other defects 39a and 39b are not marked at all because they fall beyond the second laser line 30b. In addition, as referred to above, an end edge defect 40 is marked with a single mark 40a. A second mark is not required here because defect 40 is in an end edge rather than within the width of raw board 14, and by definition it therefore continues to the end of the board.

As shown in FIGS. 1 and 7, a scanner 42 is secured on a scanner bracket 42a attached to rip saw mechanism 28 and thereby positioned over rip conveyor 17 just downstream from the rip saw blade 28a. The scanner 42 which includes at least one electric eye is provided for the purpose of detecting, recording and transmitting the positions of the defect marks, such as marks 34a and 34b, 38a and 38b and 40a to the computer 11 upon emergence of the raw board 14 from the rip saw, such as after removal of the waste area 36. After the waste area 36 is entirely removed, raw board 14 is moved to a return conveyor 44 (FIG. 1) by transfer means disclosed below. This return conveyor 44 is oriented generally parallel to rip conveyor 17 and conveys raw board 14 in a direction generally the reverse of the rip conveyor.

Return conveyor 44 thus delivers board 14 back to the input conveyor 12, where it is again held by movable fingers 20 from moving onto rip conveyor 17 until the operator 32 is ready to process it. In the meantime, any other boards 14 earlier on input conveyor 12 are held out of the way of the first board by an additional set of movable fingers 46 located on the input conveyor just before its intersection with return conveyor 44. During the time raw board 14 is being conveyed back to input conveyor 12, the computer 11, having received the full width and first clear width information from fence 26 and the defect location information from scanner 42, calculates the optimum ripping width and the appropriate cut-off lengths within that width, considering the required boards listed on the manifest and not yet prepared. For instance, if a product board is called for in the manifest the width of which is narrower than the first clear width, it may be optimal to use that cutting width, resulting in a sub-board that has no defects. If, however, due to some unusual length requirement of that width of product board, using that width would result in excessive waste, the computer may select a different width, which may be larger than the first clear width, if the result is less wasteful of the raw board 14.

Also while raw board 14 is being returned to input conveyor 12, other additional boards may be similarly processed, so that the a high degree of efficiency and productivity is maintained.

Then, when the first board 14 again reaches rip saw mechanism 28, the operator 32 uses fence 26 to determine the next clear width as described above with respect to the first clear width. The board is then ripped according to the predetermined width calculated in the last pass, and as that cut is being made, the operator again marks the defects in the next region, between the first and second laser lines 30a and 30b respectively, as set forth above. In this case, after passage through the rip saw mechanism 28, the result is a sub-board 48, the width of which is the width predetermined above, and a remainder board 50. Remainder board 50 is returned for further processing via return conveyor 44 as referred to above and described in more detail below, while computer 11 calculates the optimum solution for ripping it according to the new clear width information received from fence 26 and scanner 42 on the latest pass.

Downstream from rip saw blade 28a but as near as possible thereto, there is preferably placed a separation means 52, for maintaining the same separation between remainder board 50 and sub-board 48 or waste portion 36 as caused by the kerf of the saw, so as to ensure a straight cut. Preferably separation means 52 includes a wheel 52a journaled to a bracket 52b, which is in turn journaled to scanner bracket 42a. The wheel 52a is thus positioned between rip saw blade 28a and scanner 42, coplanar with blade 28a, with the axis thereof being oriented transverse to the direction of travel of second path 17a. Wheel 52a is vertically located such that the distance between the bottom of its circumferential edge and rip conveyor 17 is less than the thickness of raw board 14. Further, the thickness of wheel 52a is preferably about the same as the width of the saw kerf. Hence in operation, wheel 52a runs between remainder board 50 and sub-board 48 so as to maintain the same separation as exists after being cut by saw blade 28a.

Because of limitations imposed by rip saw mechanism 28a, wheel 52a must generally be separated from rip saw blade 28a by some distance. Since this distance is generally large enough that the kerf of the saw could become closed, just by normal movement of the pieces 48 and 50, before wheel 52a is reached, shutdown means 52c are provided to cause shutdown of rip saw mechanism 28 in the event of such closure of the kerf. In the preferred embodiment, this shutdown means 52c includes a sensor or switch 52d attached to wheel bracket 52b as shown in FIG. 7 or to scanner bracket 42a, to sense relative motion between those two brackets. In those cases where kerf closure occurs, wheel 52a will ride upward between remainder board 50 and sub-board 48, causing wheel bracket 52b to pivot upward, as shown in phantom in FIG. 7. This will actuate switch 52d, to cause rip saw mechanism 28 to shut down thus preventing any damage to scanner 42.

As a further aid to separation maintenance, separation plates 17b may be attached to or integrated with the rollers of the rip conveyor 17, stated earlier to be preferably a roller conveyor. These separation plates 17b rotate with the respective rollers and again maintain separation between remainder board 50 and sub-board 48 all the way to the end of rip conveyor 17.

As shown in FIG. 7A, each of the last few rollers 17c of conveyor 17 preferably has two separate auger-type spiral blades or "flights" 17d and 17e, each one beginning at separation plate 17b of the respective roller, and leading away from the separation plate to the end of the roller. On the side of rip conveyor 17 corresponding to remainder board 50, a raised driven roller 53a is placed at the distal end of the rip conveyor. Thus when remainder board 50 reaches driven roller 53a, the flight 17d on the remainder side of the rollers 17c and the driven roller carry the board off the conveyor and onto a transfer conveyor 55 (FIG. 1), which transfers the remainder board to the return conveyor 44 as mentioned several times earlier in this description. On the opposite side of conveyor 17, again at the distal end thereof, is a movable stop 53b, which is under the control of the computer 11, such as by means a power cylinder 53c (FIGS. 7 and 7A).

When the portion of raw board 14 on that side of conveyor 17 is waste portion 36, cylinder 53c is energized and movable stop 53b is moved up into position, to prevent the movement of waste portion 36 past the stop. When waste portion 36 contacts stop 53b, similar to when remainder board 50 contacts driven roller 53a, waste portion 36 is moved off its respective side of the conveyor 17 by the flights 17e of the rollers 17c, and onto a waste elimination means 57, preferably including a waste transfer conveyor 57a and a waste disposal conveyor 57b. Waste transfer conveyor 57a is preferably a chain conveyor running transverse to both rip conveyor 17 and waste disposal conveyor 57b. These last two conveyors are generally parallel to each other, although they may likely run in opposite directions.

On the other hand, when the portion of raw board 14 on that side of separation plates 17b is sub-board 48, the computer 11 issues a command to lower stop 53b or move it out of the way, allowing the sub-board to continue past for further processing.

In the preferred embodiment, as shown in more detail in FIG. 10, waste elimination means 57 further includes means for disposing of any strip remaining on the far side of remainder board 50 after processing as completely as possible. To this end, waste transfer conveyor 57a preferably extends entirely underneath rip conveyor 17 and actually reaches to the opposite side thereof. A set of switching bars 57c (FIGS. 10 and 1), each pivotally mounted at its bottom end and controlled by the computer 11, such as by a power cylinder (not shown) is used to determine the treatment of the board that falls off the remainder side of rip conveyor 17. During normal operation, if remainder board 50 is to be re-processed, that is, the board width between the latest cut and the last clear edge is greater than the the smallest width of a product board remaining on the manifest, switching bars 57c are kept in their "recycle" position, as shown in solid lines in FIG. 10. In this position their upper ends are tilted toward rip conveyor 17, so that any remainder board 50 coming off that side of the rip conveyor will slide onto transfer conveyor 55 and be recycled via return conveyor 44 (FIG. 1), as referred to earlier. However, when the computer 11 determines that the remainder board is too small for recycling, that is, the width dimension of that board is less than the width of the smallest board left unfulfilled in the manifest, the computer issues a command to switch the bars 57c to their "disposal" position, shown in phantom in FIG. 10. In that position, switching bars 57c allow any board dropping off that side of rip conveyor 17 to slide directly onto waste transfer conveyor 57a, and on to disposal conveyor 57b for disposal The next station in the processing of the sub-board 48 is a cut-off station 56, which is served by a cut-off conveyor 54. Cut-off conveyor 54 is positioned at the end of rip conveyor 17, aligned with the product side 17c of the conveyor 17 and located in receiving relation therewith, and is preferably a belt conveyor. It conveys sub-board 48 in generally the same direction as had rip conveyor 17, to cut-off station 56, which includes an automatic cut-off saw 58, shown schematically in FIG. 7. The cut-off saw 58 may be any suitable programmably controllable cut-off saw, such as Precision Products Model 14 U. Referring now to FIGS. 8 and 9, cut-off saw 58 is again connected to and controlled by computer 11 so as to cut sub-board 48 to the predetermined cut-off lengths as described above, resulting in at least one and generally a plurality of product boards 60, and normally also, although not always, one or more scrap pieces 61. Any scrap pieces 61, such as the area of defects 34, 38 and 40, is discarded at this station 56 by a scrap blow-off device 62, disclosed in more detail below. Finally, cut-off conveyor 54 transports product boards 60 to a labelling station 64, also disclosed in more detail below, where an automatic labeller 66, again under the control of computer 11, labels each product board according to its part number as contained in the manifest in the computer. Computer 11 thus at that time records that the particular requirements of the manifest are satisfied by product boards 60 obtained from sub-board 48, leaving only the rest of the manifest to be fulfilled by the following sub-boards.

Figure 11:
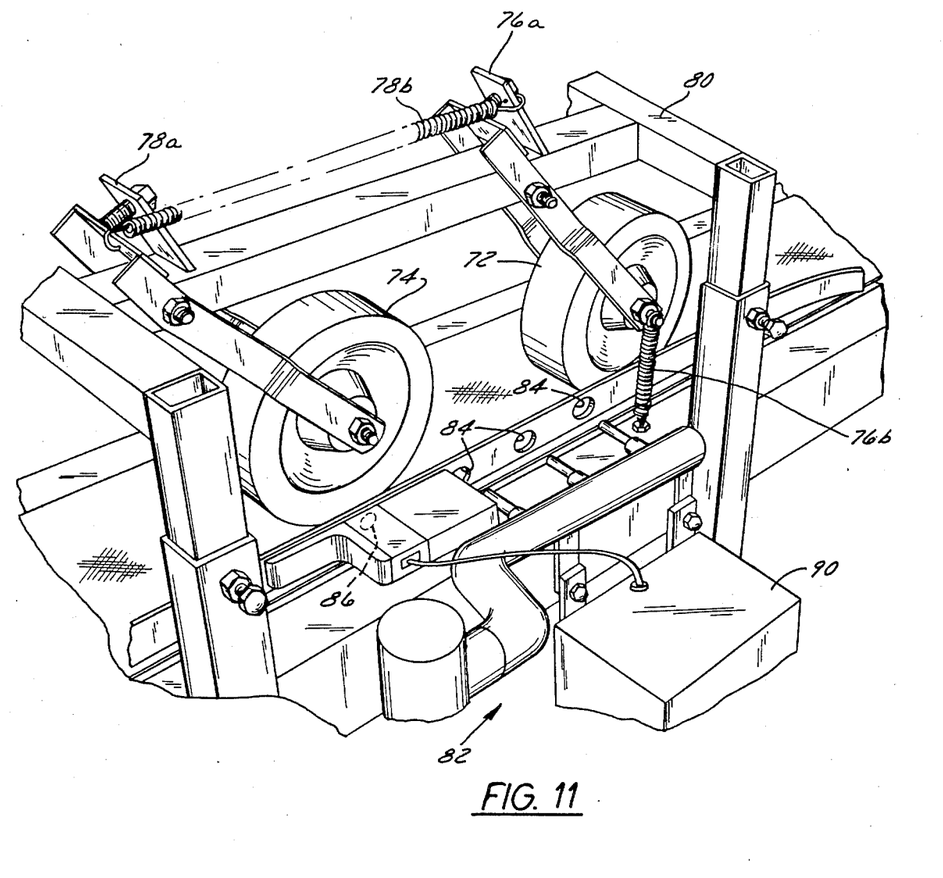
FIG. 11 is an isometric view of the back of the blow-off mechanism shown in FIGS. 8 and 9.

Scrap blow-off device 62 may include any device which is effective to move a scrap piece 61 off the cut-off conveyor 54 and onto waste elimination means 57, and in particular preferably waste disposal conveyor 57b. Referring now to FIGS. 8, 9 and 11, in the preferred embodiment, scrap blow-off device 62 includes a pair of wheel-bracket assemblies 68 and 70. Each wheel-bracket assembly 68 and 70 respectively includes a wheel 72 and 74, each wheel being journaled to a support bracket 76 and 78 respectively, each of which support brackets is pivotally connected to a support frame 80 of any suitable configuration positioned at the side of cut-off conveyor 54. Both support brackets 76 and 78 are provided with stops 76a and 78a respectively such that the respective wheel 72 or 74 is positioned within a distance of the upper surface of cut-off conveyor 54 that is less than the smallest thickness of any product board. The support brackets 76 and 78a are biased toward the stops 76a and 78a by springs 76b and 78b respectively. An actuation means 82 is associated with the scrap blow-off device 62 so that when any product board is on the cut-off conveyor 54 and beneath either wheel 72, a high pressure air stream from one or more nozzles 84, affixed to the support frame 80, is directed against the side of the particular board positioned there. Actuation means 82 may include an electric eye 86 positioned to be aligned with the lowermost point of the leading wheel 72, and connected to a control unit 90 which controls a supply 92 of compressed air to nozzles 84. Thus, when a product board 60 or a scrap piece 61 causes wheel 72 to lift, control unit 90 allows compressed air to escape from nozzles 84. Computer 11 is programmed to cut any scrap pieces 61, that is, any pieces marked to contain a defect such as defects 38 or 40, shorter than the smallest dimension of a regular product board 60. Accordingly, since scrap pieces 61 are cut shorter than product boards 60, the spacing S between wheels 72 and 74 is set so that product boards 60 will have pressure from at least one of the wheels at all times so as to keep it on cut-off conveyor 54, as shown in FIG. 9. As to scrap pieces 61, however, there will be times when these are entirely between wheels 72 and 74, as shown in FIG. 8. Air pressure from nozzles 84 will then blow scrap pieces 61 off cut-off conveyor 54 and onto waste elimination means 57 for disposal, while product boards 60 are held on the cut-off conveyor for transport to the next station, labelling station 64. A chute 94 (FIG. 1) may be added between the scrap blow-off device 62 and the waste disposal conveyor 57b to aid in getting the scrap pieces to that conveyor.

Automatic labeller 66 positioned at labelling station 64 may include any suitable means for attaching identifying information to each product board 60 according to the records kept by computer 11. In practice, the applicants have found the INNO-PRINT MODEL A printer to work well in this application, being an ink jet printer-type model. Labeller 66 itself is preferably located alongside cut-off conveyor 54, with the printhead portion 66a thereof aligned with the product boards 60.

While the apparatus hereinbefore described is effectively adapted to fulfill the aforesaid objects, it is to be understood that the invention is not intended to be limited to the particular preferred embodiments of the method and apparatus for optimizing lumber yield herein set forth. Rather, it is to be taken as including all reasonable equivalents without departing from the scope of the appended claims.

What is claimed as the invention is:

1. A method for optimizing the yield of a generally rectangular raw board, having defects randomly located therein, into a number of product boards not having defects according to predetermined specifications, said number and specifications being stored in a manifest in an electronic computer means, and for minimizing waste in the operation of cutting said raw board, said manifest including a product board width which is the largest product board width and a product board width which is the smallest product board width of said manifest, said method comprising the steps of:
   determining a first clear width as near as possible to a near edge of said raw board;
   determining a full width on said raw board;
   transmitting said first clear width and said full width to said electronic computer means;
   cutting off that portion of said raw board between said near edge and said first clear width as waste, while calculating an optimum solution for said product boards to be cut, so as to result in the least amount of waste of said raw board;
   marking all defects within said largest product board with;
   cutting a first sub-board from said raw board lengthwise, with the width thereof being determined according to the solution provided by said electronic computer means, leaving a remainder board; and
   thereafter cutting said first sub-board transversely into at least one product board, thereby removing any waste therefrom, according to said solution.

2. A method as recited in claim 1 further comprising the steps of:
   determining on said remainder board a next clear width located between the edge of said remainder board from which said first sub-board was cut and the edge of the next nearest defect on said remainder board;
   transmitting said next clear width to said electronic computer means and calculating an optimum solution for product boards to be cut from within said remainder board, so as to result in the least amount of waste of said remainder board;
   marking all defects within said largest product board width;
   cutting a second sub-board from said remainder board lengthwise, with the width thereof being determined according to the solution provided by said electronic computer means, leaving a smaller remainder board;
   thereafter cutting said second sub-board transversely into at least one product board, thereby removing any waste therefrom, according to said solution; and
   continuing to perform said determining, transmitting, marking and lengthwise cutting steps until the width of a subsequent remainder board is less than said smallest product board width.

3. A method for optimizing the yield of a generally rectangular raw board, having a defects randomly located therein, into a number of product boards not having defects according to predetermined specifications, said number and specifications being stored in a manifest in an electronic computer means, and for minimizing waste in the operation of cutting said raw board, said manifest including a product board width which is the largest product board width and a product board width which is the smallest product board width of said manifest, comprising the steps of:
   determining a first line clear of defects as near as possible to a near edge of said raw board;
   determining a second line indicating the edge of a first defect nearest said first line, the distance between said first line and said second line determined to be a first clear width;
   determining a last line clear of defects on a far edge of said raw board, the distance between said first line and said last line determined to be a full width;
   transmitting said clear width and said full width to said electronic computer means;
   cutting off that portion of said raw board between said near edge and said first line as waste, while calculating an optimum solution for product boards to be cut from within said largest product board width, so as to result in the least amount of waste of said raw board;

marking all defects within said largest product board width;

cutting a sub-board from said raw board lengthwise, with the width thereof being determined according to the solution provided by said electronic computer means, leaving a remainder board; and thereafter cutting said sub-board transversely into at least one product board, thereby removing any waste therefrom, according to said solution.

4. A method as recited in claim 3 further comprising the steps of:

determining on said remainder board a next line indicating the edge of the next defect nearest said second line on said remainder board, the distance between said second line and said next line being maximized and determined to be the next clear width;

transmitting said next clear width to said electronic computer means and calculating an optimum solution for product boards to be cut from within said largest product board width, so as to result in the least amount of waste of said raw board;

marking all defects from said second line up to said largest product board width;

cutting another sub-board from said remainder board lengthwise, with the width thereof being determined according to the solution provided by said electronic computer means, leaving a smaller remainder board;

thereafter cutting said other sub-board transversely into at least one product board, thereby removing any waste therefrom, according to said solution; and continuing to perform said determining, transmitting, marking and lengthwise cutting steps until the width of a subsequent remainder board is smaller than said smallest product board width.

5. A method for optimizing the yield of a generally rectangular raw board, having defects randomly located therein, into a predetermined number of product boards according to a predetermined specification, said predetermined number and specification being stored in a manifest in an electronic computer means, and for minimizing waste in the operation of cutting a raw board, said manifest including a product board width which is the largest product board width and a product board width which is the smallest product width of said manifest, said method comprising the steps of:

determining a first line clear of defects as near as possible to a near edge of said raw board;

determining a second line indicating the edge of the first defect nearest said first line, the distance between said first line and said second line determined to be the first clear width;

determining a last line clear of defects on a far edge of said raw board, the distance between said first line and said last line determined to be the full width;

transmitting said clear width and said full width to said electronic computer means;

cutting off that portion of said raw board between said near edge and said first line as waste, while calculating an optimum solution for product boards to be cut from within said largest product board width, so as to result in the least amount of waste of said raw board;

marking all defects from said first line to said largest product width;

cutting a sub-board from said raw board lengthwise, with the width thereof being determined according to the solution provided by said electronic computer means, leaving a remainder board; and thereafter cutting said sub-board transversely into at least one product board, thereby removing any waste therefrom, according to said solution, while returning to said remainder board and determining on said remainder board a next line indicating the edge of the next defect nearest said second line on said remainder board, the distance between said second line and said next line being maximized and determined to be the next clear width;

transmitting said next clear width to said electronic computer means and calculating an optimum solution for product boards to be cut from between said second line to said largest product board width, so as to result in the least amount of waste of said raw board;

marking all defects from said second line to said largest product width;

cutting a second sub-board from said remainder board lengthwise, with the width thereof being determined according to the solution provided by said electronic computer means, leaving a smaller remainder board;

thereafter cutting said second sub-board transversely into at least one product board, thereby removing any waste therefrom, according to said solution; and continuing to perform said determining, transmitting, marking, lengthwise cutting and transversely cutting steps until said full width has been optimally and completely used to produce said product boards.

6. A method as recited in claim 1, claim 2, claim 3, claim 4 or claim 5 further comprising the step of automatically labelling each of said product boards, using identification information from said electronic computer means.

7. An apparatus for optimizing the yield from generally rectangular raw board, having defects randomly located therein, thereby cutting said raw board into an optimum number of various different product boards of predetermined specification and having no defects, comprising:

first conveyor means for conveying said raw board along a first path to a first station;

second conveyor means for transporting said raw board along a second path transverse to said first path and away from said first station;

an adjustable fence located at said first station, oriented along said second path and movable transversely to said second path;

temporary line-forming means located at said first station, for temporarily forming lines lengthwise on said raw board and transverse to said first path, and cooperating with said fence to determine a clear width and a full width of said raw board;

means for detecting defects on said raw board between said lengthwise lines, and for indicating the location thereof of any of said defects therebetween;

means for cutting said raw board lengthwise into a sub-board and a remainder board;

electronic computer means for receiving said clear width and said full width from said fence and calculating an optimum solution as to the width and length of product boards to be cut, thereby determining the width of the sub-board and the length of the product boards to be cut from said sub-boards;

means, located at a second station, for cutting said sub-board transversely into at least one product board; and third conveyor means for transporting said remainder board back to said first station.

8. An apparatus as recited in claim 7 further comprising means disposed between said first station and said second station for separating said sub-board from said remainder board and directing said remainder board toward said third conveyor means.

9. An apparatus as recited in claim 7 wherein said means include at least one light source for projecting a light beam along the length of said raw board, said light source being attached at said first station independent of the movement of said fence.

10. An apparatus as recited in claim 9 wherein said light source is a source of collimated light.

11. An apparatus as recited in claim 7 wherein said lengthwise cutting means includes means for detecting said defects, and for transmitting information about the location of said defects to said electronic computer means.

12. An apparatus as recited in claim 11 wherein said means for detecting said defects includes at least one electric eye for detecting said defects.

13. A method for processing a generally rectangular raw board having defects randomly located therein so as to provide, with a minimum of waste, a plurality of product boards free of said defects and of predetermined lengths and widths, said method comprising the steps of:

defining first and second waste areas lengthwise and along the near edge and the far edge, respectively, of said raw board;

defining a first clear width lengthwise of said raw board and adjacent said first waste area;

defining a full width lengthwise of said raw board and between said first and second waste areas;

cutting said raw board lengthwise to remove said first waste area;

performing calculations involving said full width, said first clear width and the location of defects within widest product board and further involving predetermined specifications as to the length and width of product boards to be produced to provide a cutting solution which will provide boards of predetermined width and length and free of defects with a minimum of waste;

cutting said raw board lengthwise in accordance with said solution to remove said first clear width and thereby provide a sub-board and a remainder board;

and cutting said sub-board transversely in accordance with said solution to provide at least one product board.

14. A process according to claim 13 further including the steps of cutting said remainder board lengthwise in accordance with said solution to provide another sub-board and a smaller remainder board and cutting said ither sub-board transversely in accordance with said cutting solution to provide at least another product board.

15. A process according to claims 13 or 14 wherein the step of performing calculations is carried out while said raw board is being cut lengthwise to remove said first waste area.

* * * * *